(12) United States Patent
Nagano et al.

(10) Patent No.: US 9,023,953 B2
(45) Date of Patent: ***May 5, 2015

(54) PROCESS FOR PRODUCTION OF POLY(LACTIC ACID)-TYPE RESIN, AND POLY(LACTIC ACID)-TYPE PREPOLYMER

(75) Inventors: Tatsuya Nagano, Tokai (JP); Tsuyoshi Tanaka, Nagoya (JP); Hiroyuki Ome, Tokai (JP)

(73) Assignee: Toray Industries, Inc. (JP)

( * ) Notice: Subject to any disclaimer, the term of this patent is extended or adjusted under 35 U.S.C. 154(b) by 148 days.

This patent is subject to a terminal disclaimer.

(21) Appl. No.: 13/825,992

(22) PCT Filed: Jun. 27, 2011

(86) PCT No.: PCT/JP2011/064631
§ 371 (c)(1),
(2), (4) Date: Mar. 26, 2013

(87) PCT Pub. No.: WO2012/042993
PCT Pub. Date: Apr. 5, 2012

(65) Prior Publication Data
US 2013/0197186 A1    Aug. 1, 2013

(30) Foreign Application Priority Data
Sep. 28, 2010    (JP) ................. 2010-216643

(51) Int. Cl.
| | |
|---|---|
| *C08G 63/91* | (2006.01) |
| *C08G 63/06* | (2006.01) |
| *C08G 63/08* | (2006.01) |
| *C08G 63/80* | (2006.01) |

(52) U.S. Cl.
CPC ............... *C08G 63/06* (2013.01); *C08G 63/08* (2013.01); *C08G 63/80* (2013.01)

(58) Field of Classification Search
CPC .......................... A61K 9/204; A61K 9/5153
USPC .................. 525/410, 415, 419, 450
See application file for complete search history.

(56) References Cited

U.S. PATENT DOCUMENTS

| 8,173,753 B2 * | 5/2012 | Nagano et al. ............... 525/415 |
| 2011/0065871 A1 * | 3/2011 | Nagano et al. ............... 525/450 |

FOREIGN PATENT DOCUMENTS

| CN | 101805498 | | 8/2010 |
|---|---|---|---|
| JP | 8-183840 | A | 7/1996 |
| JP | 8-193124 | A | 7/1996 |
| JP | 8-231688 | A | 9/1996 |
| JP | 11-106499 | A | 4/1999 |
| JP | 2000-273165 | A | 10/2000 |
| JP | 2000-297143 | A | 10/2000 |
| JP | 2000-297145 | A | 10/2000 |
| JP | 2000-302852 | A | 10/2000 |
| JP | 2001-064375 | A | 3/2001 |
| JP | 2001-192444 | A | 7/2001 |
| JP | 2009-144132 | A | 7/2009 |
| WO | 2009/142196 | C | 11/2009 |

* cited by examiner

*Primary Examiner* — Gregory Listvoyb
(74) *Attorney, Agent, or Firm* — DLA Piper LLP (US)

(57) ABSTRACT

A method of producing a poly(lactic acid) resin includes carrying out direct polycondensation using lactic acid as a main raw material to prepare a crystallized prepolymer having a weight average molecular weight of 5,000 to 25,000, an enthalpy of fusion ΔHm of 50 to 65 J/g and an acid value A mol/ton satisfying (1) below:

$$450/(Mw/10,000-0.14) < A < 950/(Mw/10,000-0.14) \quad (1)$$

(wherein Mw represents weight average molecular weight of the crystallized prepolymer); and subjecting the crystallized prepolymer to solid-phase polymerization.

14 Claims, No Drawings

PROCESS FOR PRODUCTION OF POLY(LACTIC ACID)-TYPE RESIN, AND POLY(LACTIC ACID)-TYPE PREPOLYMER

TECHNICAL FIELD

This disclosure relates to a method of efficiently producing a poly(lactic acid) resin having a high molecular weight and, preferably, having a high melting point as well as excellent thermal stability and hue.

BACKGROUND

In recent years, from the viewpoint of environmental protection, attention has been paid to poly(lactic acid) resins, and especially to polylactic acid resins as plant-based carbon neutral materials. Polylactic acid resins have melting points of as high as about 170° C. and can be processed by melt-molding. Further, since lactic acid, which is the monomer for those resins, can now be produced inexpensively by a fermentation method using microorganisms, polylactic acid resins are expected as bioplastics which can replace the petroleum-based commodity plastics, and gradually becoming common.

Major methods of producing polylactic acid resins are the ring-opening polymerizetion method by polymerization of lactide, which is a lactic acid dimer, by ring-opening, and the direct polycondensation method by dehydration polycondensation using lactic acid. The direct polycondensation method is said to be capable of more inexpensively producing a polylactic acid resin compared to the ring-opening polymerization method since the step of synthesizing lactide is not necessary and lactic acid can be directly used as a polymerization raw material.

JP 8-183840 A, JP 2000-297145 A, JP 2000-297143 A, JP 11-106499 A, JP 2000-302852 A, JP 2001-192444 A, JP 2001-064375 A, JP 2009-144132 A, JP 2000-273165 A and WO 2009/142196 A1 describe the direct polycondensation method. JP '840, JP '145 and JP '143 describe methods of producing polylactic acid by direct melt polymerization. JP '499 discloses a production method by combination of melt polymerization and solid-phase polymerizetion. JP '852, JP '444, JP '375 and JP '132 also disclose production methods by combination of melt polymerization and solid-phase polymerization. JP '165 and WO '196 also discloses production methods by combination of melt polymerization and solid-phase polymerization.

In the techniques described in JP '840, JP '145 and JP '143, there is a problem in that the obtained molecular weight is low and use of a solvent is necessary for obtaining a high-molecular-weight product. Further, in the method of JP '143, there is the problem of coloring of the polymer.

In the technique described in JP '499, the molecular weight after solid-phase polymerization is insufficient even when the molecular weight before the solid-phase polymerization was high.

In the techniques described in JP '852, JP '444, JP '375 and JP '132, since crystallization in water, crystallization for a long time, or crystallization with hot air containing moisture is carried out before solid-phase polymerization, acidic compounds increase in the polymer so that the rate of solid-phase polymerization and the yield of the polymer decrease, which is problematic.

In the technique described in JP '165, crystallization before solid-phase polymerizetion is insufficient and a sufficient rate of solid-phase polymerization cannot be obtained. In the technique described in WO '196, contacting with air occurs for a long time during the process from melt polymerization to solid-phase polymerization because of pulverization and the like, leading to an increase in acidic substances and, hence, resulting in a decreased solid-phase polymerization efficiency.

It could therefore be helpful to provide a method of efficiently producing a poly(lactic acid) resin having a high molecular weight and, preferably, having a high melting point as well as excellent thermal stability and hue.

SUMMARY

We discovered a method of efficiently producing a poly(lactic acid) resin having a high molecular weight and, preferably, having a high melting point as well as excellent thermal stability and hue.

That is, we provide a method of producing a poly(lactic acid) resin comprising the steps of:

carrying out direct polycondensation using lactic acid as a main raw material to prepare a crystallized prepolymer having a weight average molecular weight of 5,000 to 25,000, an enthalpy of fusion ΔHm of 50 to 65 J/g and an acid value A mol/ton satisfying (1) below; and subjecting the crystallized prepolymer to solid-phase polymerization:

$$450/(Mw/10,000-0.14) < A < 950/(Mw/10,000-0.14) \quad (1)$$

(wherein Mw represents the weight average molecular weight of the crystallized prepolymer).

The lactide content L of the crystallized prepolymer is preferably 0.1 to 3.0 wt %.

Preferably, the crystallized prepolymer is poly-L-lactic acid or poly-D-lactic acid and, in the case of poly-L-lactic acid, the D-lactic acid content d is 0.2 to 2.0 mol %, and in the case of poly-D-lactic acid, the L-lactic acid content l is 0.2 to 2.0 mol %.

The crystallized prepolymer is preferably in the form of a pellet.

The enthalpy of fusion ΔHm of the crystallized prepolymer is preferably not less than 53 J/g.

The acid value A mol/ton of the crystallized prepolymer preferably satisfies (2) below:

$$550/(Mw/10,000-0.14) < A < 850/(Mw/10,000-0.14) \quad (2).$$

The temperature increasing rate in the solid-phase polymerization is preferably not more than 10° C. per hour.

The final temperature in the solid-phase polymerization is preferably 155 to 165° C.

The crystallized prepolymer is preferably produced using a tin compound or sulfonic acid compound as a catalyst.

The weight average molecular weight is preferably 5,000 to 25,000; the enthalpy of fusion ΔHm is preferably 50 to 65 J/g; and the acid value A mol/ton satisfies (1) below:

$$450/(Mw/10,000-0.14) < A < 950/(Mw/10,000-0.14) \quad (1)$$

(wherein Mw represents the weight average molecular weight of the crystallized prepolymer).

The crystallized poly(lactic acid) prepolymer is preferably prepared by carrying out direct polycondensation using lactic acid as a main raw material to obtain a prepolymer, and crystallizing the prepolymer.

A poly(lactic acid) resin having a high molecular weight and, preferably, having a high melting point as well as excellent thermal stability and hue can be efficiently produced.

DETAILED DESCRIPTION

The poly(lactic acid) resin is a polymer containing as a major component(s) L-lactic acid and/or D-lactic acid and, in cases where L-lactic acid is a major component, the resin is called poly-L-lactic acid, and in cases where D-lactic acid is a major component, the resin is called poly-D-lactic acid.

In cases where the poly(lactic acid) resin is poly-L-lactic acid, the L-lactic acid unit is preferably contained in an amount of not less than 70 mol %, more preferably contained in an amount of not less than 90 mol %, still more preferably contained in an amount of not less than 95 mol %, especially preferably contained in an amount of not less than 98 mol %.

In cases where the poly(lactic acid) resin is poly-D-lactic acid, the D-lactic acid unit is preferably contained in an amount of not less than 70 mol %, more preferably contained in an amount of not less than 90 mol %, still more preferably contained in an amount of not less than 95 mol %, especially preferably contained in an amount of not less than 98 mol %.

The poly(lactic acid) resin is preferably a mixture of poly-L-lactic acid and poly-D-lactic acid, and is more preferably forming a stereocomplex.

The resin is also preferably a block copolymer constituted of a segment(s) composed of L-lactic acid units and a segment(s) composed of D-lactic acid units. The segment composed of L-lactic acid units herein means a polymer containing L-lactic acid as a major component, which polymer contains not less than 70 mol % of L-lactic acid units. The L-lactic acid units are more preferably contained in an amount of not less than 90 mol %, still more preferably contained in an amount of not less than 95 mol %, especially preferably contained in an amount of not less than 98 mol %. The segment composed of D-lactic acid units herein means a polymer containing D-lactic acid as a major component, which polymer contains not less than 70 mol % of D-lactic acid units. The D-lactic acid units are more preferably contained in an amount of not less than 90 mol %, still more preferably contained in an amount of not less than 95 mol %, especially preferably contained in an amount of not less than 98 mol %.

Lactic acid is used as a main raw material to produce a poly(lactic acid) resin by direct polycondensation. The main raw material to be used is preferably high purity lactic acid in which, in terms of impurities in the lactic acid, the total amount of alcohols is not more than 70 ppm; the total amount of organic acids is not more than 800 ppm; the total amount of aldehydes is not more than 50 ppm; and the total amount of esters is not more than 400 ppm.

The optical purity of the lactic acid to be used is preferably not less than 95%, more preferably not less than 98%, especially preferably not less than 99%. In cases where the lactic acid is L-lactic acid, the D-lactic acid content is preferably not more than 2.5%, more preferably not more than 1.0%, especially preferably not more than 0.5%. In cases where the lactic acid is D-lactic acid, the L-lactic acid content is preferably not more than 2.5%, more preferably not more than 1.0%, especially preferably not more than 0.5%.

The polylactic acid may contain component units other than L-lactic acid and D-lactic acid units as long as the performance of the obtained polylactic acid is not adversely affected. Examples of the other component units include polycarboxylic acid, polyalcohol, hydroxycarboxylic acid and lactone. Specific examples of the units include: polycarboxylic acids such as succinic acid, adipic acid, sebacic acid, fumaric acid, terephthalic acid, isophthalic acid, 2,6-naphthalenedicarboxylic acid, 5-sulfoisophthalic acid monosodium salt, cyclohexanedicarboxylic acid, 5-sulfoisophthalic acid mono(tetrabutylphosphonium) salt, furandicarboxylic acid, and derivatives thereof; polyalcohols such as ethylene glycol, propylene glycol, butanediol, pentanediol, hexanediol, octanediol, isosorbide, neopentyl glycol, glycerin, trimethylolpropane, pentaerythritol, trimethylolpropane, polyalcohol prepared by addition of ethylene oxide or propylene oxide to pentaerythritol, aromatic polyalcohol prepared by addition reaction of bisphenol with ethylene oxide, diethylene glycol, triethylene glycol, polyethylene glycol and polypropylene glycol, and derivatives thereof; hydroxycarboxylic acids such as glycolic acid, 3-hydroxybutyric acid, 4-hydroxybutyric acid, 4-hydroxyvaleric acid and 6-hydroxycaproic acid; and lactones such as glycolide, ε-caprolactone glycolide, ε-caprolactone, β-propiolactone, δ-butyrolactone, β- or γ-butyrolactone, pivalolactone and δ-valerolactone.

The method of producing a poly(lactic acid) resin comprises the steps of:
carrying out melt polymerization to obtain a prepolymer;
crystallizing the prepolymer to prepare a crystallized prepolymer having a weight average molecular weight of 5,000 to 25,000, an enthalpy of fusion ΔHm of 50 to 65 J/g and an acid value A mol/ton satisfying (1) below; and
subjecting the crystallized prepolymer to solid-phase polymerization:

$$450/(Mw/10{,}000 - 0.14) < A < 950/(Mw/10{,}000 - 0.14) \quad (1)$$

(wherein Mw represents the weight average molecular weight of the prepolymer).

First, the step of melt polymerization is described.

The step of melt polymerization is preferably carried out in the coexistence of a catalyst, and the catalyst is preferably a sulfur-containing compound containing sulfur having an oxidation number of not less than +5. Examples of such a compound include oxoacids of sulfur and sulfonic acid group-containing compounds. Specific examples of the oxoacids of sulfur include sulfuric acid, disulfuric acid, thiosulfuric acid, dithionic acid, trithionic acid, tetrathionic acid, polythionic acid, sulfurous acid, disulfurous acid and dithionous acid. Specific examples of the sulfonic acid group-containing compounds include aromatic sulfonic acids such as benzenesulfonic acid, n-butylbenzenesulfonic acid, n-octylbenzenesulfonic acid, n-dodecyl-benzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino-4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, p-chlorobenzenesulfonic acid, 2,5-dichlorobenzenesulfonic acid, hydroxynitrobenzenesulfonic acid, aminotoluenesulfonic acid, p-phenolsulfonic acid, aminophenolsulfonic acid, cumenesulfonic acid, xylenesulfonic acid, o-cresolsulfonic acid, m-cresolsulfonic acid, p-cresolsulfonic acid, p-toluenesulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, naphtholsulfonic acid, naphthylaminesulfonic acid, sulfanilamide, sulfaguanidine, dinonylnaphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, aminohydroxynaphthalenedisulfonic acid, 4,4-biphenyldisulfonic acid, anthraquinone-2-sulfonic acid, o-benzenedisulfonic acid, m-benzenedisulfonic acid, p-benzenedisulfonic acid, 2,5-diamino-1,3-benzenedisulfonic acid, aniline-2,4-disulfonic acid, anthraquinone-1,5-disulfonic acid, benzidinedisulfonic acid, 1-naphthol-2-sulfonic acid, 2-naphthol-3,6-disulfonic acid, 2-naphthol-6,8-disulfonic acid, 1,3,5-benzenetrisulfonic acid, polystyrenesulfonic acid, catechol-3,5-disulfonic acid and phenol-2,4-disulfonic acid; aliphatic sulfonic acids such as methanesulfonic acid, ethanesulfonic acid, 1-propanesulfonic acid, butanesulfonic acid, pentanesulfonic acid, hexanesulfonic acid, heptanesulfonic acid, n-octylsulfonic acid, nonanesulfonic acid, decanesulfonic acid, undecylsulfonic acid, dodecylsulfonic acid, tridecylsulfonic acid, tetradecylsulfonic acid, pentadecylsulfonic acid, trifluoromethanesulfonic acid, trichloromethanesulfonic acid, methanedisulfonic acid, 1,2-ethanedisulfonic acid, 1,3-propanedisulfonic acid, 1,4-butanedisulfonic acid, pentanedisulfonic acid, hexanedisulfonic acid, heptanedisulfonic acid, octanedisulfonic acid, nonanedisulfonic acid, decanedisulfonic acid, 1,11-undecanedisulfonic acid, 12-dodecanedisulfonic acid, butanesulfonic acid, 2-hydroxyethanesulfonic acid, sulfoacetic acid and taurine; and alicyclic sulfonic acids such as cyclopentanesulfonic acid, cyclohexanesulfonic acid and camphorsulfonic acid. In view of obtaining a poly(lactic acid) resin having a high molecular weight or high melting point and, especially, excellent thermal stability, oxoacids of sulfur and sulfonic acid group-containing compounds having two or more sulfonic acid groups per one molecule are preferred. Among these, methanesulfonic acid, ethanesulfonic acid, 1-propanesulfonic acid, sulfuric acid, 1,3-propanedisulfonic acid, 1,5-naphthalenedisulfonic acid and taurine are especially preferred. A single type of catalyst may be used, or two or more types of catalysts may be used in combination.

Further, metal catalysts and acid catalysts other than sulfur-containing compounds containing sulfur having an oxidation number of not less than +5 may also be preferably used as the catalyst.

Examples of the metal catalysts include metal compounds such as tin compounds, titanium compounds, lead compounds, zinc compounds, cobalt compounds, iron compounds, lithium compounds and rare earth compounds, and preferred examples of the types of the compounds include metal alkoxides, halogen metal compounds, organic carboxylates, carbonates, sulfates and oxides. Specific examples of the tin compounds include tin powder, tin(II) chloride, tin(IV) chloride, tin(II) bromide, tin(IV) bromide, ethoxytin(II), t-butoxytin(IV), isopropoxytin(IV), tin(II) acetate, tin(IV) acetate, tin(II) octanoate, tin(II) laurate, tin(II) myristate, tin(II) palmitate, tin(II) stearate, tin(II) oleate, tin(II) linoleate, tin(II) acetylacetonate, tin(II) oxalate, tin(II) lactate, tin(II) tartrate, tin(II) pyrophosphate, tin(II) p-phenolsulfonate, tin(II) bis(methanesulfonate), tin(II) sulfate, tin(II) oxide, tin(IV) oxide, tin(II) sulfide, tin(IV) sulfide, dimethyltin(IV) oxide, methylphenyltin(IV) oxide, dibutyltin(IV) oxide, dioctyltin(IV) oxide, diphenyltin(IV) oxide, tributyltin oxide, triethyltin(IV) hydroxide, triphenyltin(IV) hydroxide, tributyltin hydride, monobutyltin(IV) oxide, tetramethyltin(IV), tetraethyltin(IV), tetrabutyltin(IV), dibutyldiphenyltin(IV), tetraphenyltin(IV), tributyltin(IV) acetate, triisobutyltin(IV) acetate, triphenyltin(IV) acetate, dibutyltin diacetate, dibutyltin dioctoate, dibutyltin(IV) dilaurate, dibutyltin(IV) maleate, dibutyltin bis(acetylacetonate), tributyltin(IV) chloride, dibutyltin dichloride, monobutyltin trichloride, dioctyltin dichloride, triphenyltin(IV) chloride, tributyltin sulfide, tributyltin sulfate, tin(II) trifluoromethanesulfonate, ammonium hexachlorostannate(IV), dibutyltin sulfide, diphenyltin sulfide, triethyltin sulfate and tin(II) phthalocyanine. Among these, tin compounds other than tin(II) chloride are preferred. Specific examples of the titanium compounds include titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate and titanium (IV) oxide. Specific examples of the lead compounds include diisopropoxylead(II), lead monochloride, lead acetate, lead (II) octoate, lead(II) isooctoate, lead(II) isononanoate, lead (II) laurate, lead(II) oleate, lead(II) linoleate, lead naphthenate, lead(II) neodecanoate, lead oxide and lead(II) sulfate. Specific examples of the zinc compounds include zinc powder, methylpropoxy zinc, zinc chloride, zinc acetate, zinc(II) octoate, zinc naphthenate, zinc carbonate, zinc oxide and zinc sulfate. Specific examples of the cobalt compounds include cobalt chloride, cobalt acetate, cobalt(II) octoate, cobalt(II) isooctoate, cobalt(II) isononanoate, cobalt(II) laurate, cobalt (II) oleate, cobalt(II) linoleate, cobalt naphthenate, cobalt(II) neodecanoate, cobalt(II) carbonate, cobalt(II) sulfate and cobalt(II) oxide. Specific examples of the iron compounds include iron(II) chloride, iron(II) acetate, iron(II) octoate, iron naphthenate, iron(II) carbonate, iron(II) sulfate and iron (II) oxide. Specific examples of the lithium compounds include lithium propoxide, lithium chloride, lithium acetate, lithium octoate, lithium naphthenate, lithium carbonate, dilithium sulfate and lithium oxide. Specific examples of the rare earth compounds include triisopropoxyeuropium(III), triisopropoxyneodymium(III), triisopropoxylanthanum, triisopropoxysamarium(III), triisopropoxyyttrium, isopropoxyyttrium, dysprosium chloride, europium chloride, lanthanum chloride, neodymium chloride, samarium chloride, yttrium chloride, dysprosium(III) triacetate, europium(III) triacetate, lanthanum acetate, neodymium triacetate, samarium acetate, yttrium triacetate, dysprosium(III) carbonate, dysprosium(IV) carbonate, europium(II) carbonate, lanthanum carbonate, neodymium carbonate, samarium(II) carbonate, samarium(III) carbonate, yttrium carbonate, dysprosium sulfate, europium(II) sulfate, lanthanum sulfate, neodymium sulfate, samarium sulfate, yttrium sulfate, europium dioxide, lanthanum oxide, neodymium oxide, samarium(III) oxide and yttrium oxide. Other examples of the metal catalysts include potassium compounds such as potassium isopropoxide, potassium chloride, potassium acetate, potassium octoate, potassium naphthenate, potassium t-butyl carbonate, potassium sulfate and potassium oxide; copper compounds such as copper(II) diisopropoxide, copper(II) chloride, copper(II) acetate, copper octoate, copper naphthenate, copper(II) sulfate and dicopper carbonate; nickel compounds such as nickel chloride, nickel acetate, nickel octoate, nickel carbonate, nickel(II) sulfate and nickel oxide; zirconium compounds such as tetraisopropoxyzirconium(IV), zirconium trichloride, zirconium acetate, zirconium octoate, zirconium naphthenate, zirconium(II) carbonate, zirconium(IV) carbonate, zirconium sulfate and zirconium(II) oxide; antimony compounds such as triisopropoxyantimony, antimony (III) fluoride, antimony(V) fluoride, antimony acetate and antimony(III) oxide; magnesium compounds such as magnesium diisopropoxide, magnesium chloride, magnesium acetate, magnesium lactate, magnesium carbonate, magnesium sulfate and magnesium oxide; calcium compounds such as diisopropoxycalcium, calcium chloride, calcium acetate, calcium octoate, calcium naphthenate, calcium lactate and calcium sulfate; aluminum compounds such as aluminum, aluminum isopropoxide, aluminum chloride, aluminum acetate, aluminum octoate, aluminum sulfate and aluminum oxide; germanium compounds such as germanium, tetraisopropoxygermane and germanium(IV) oxide; manganese compounds such as triisopropoxymanganese(III), manganese trichloride, manganese acetate, manganese(II) octoate, manganese(II) naphthenate and manganese(II) sulfate; and bismuth compounds such as bismuth(III) chloride, bismuth powder, bismuth(III) oxide, bismuth acetate, bismuth octoate and bismuth neodecanoate. Still other preferred examples of the metal catalysts include compounds composed of two or more kinds of metallic elements, such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate and strontium titanate.

The acid catalyst other than sulfur-containing compounds containing sulfur having an oxidation number of not less than +5 may be either a Brønsted acid as a proton donor or a Lewis acid as an electron-pair acceptor, and may be either an organic acid or an inorganic acid. Examples of the acid catalyst include monocarboxylic acid compounds such as formic acid, acetic acid, propionic acid, heptanoic acid, octanoic acid, octylic acid, nonanoic acid, isononanoic acid, trifluoroacetic acid and trichloroacetic acid; dicarboxylic acid compounds such as oxalic acid, succinic acid, maleic acid, tartaric acid and malonic acid; tricarboxylic acid compounds such as citric acid and tricarballylic acid; acidic amino acids such as aspartic acid and glutamic acid; ascorbic acid; retinoic acid; phosphoric acid compounds such as phosphoric acid, metaphosphoric acid, phosphorous acid, hypophosphorous acid, polyphosphoric acid, phosphoric acid monoesters including monododecyl phosphate and monooctadecyl phosphate, phosphoric acid diesters including didodecyl phosphate and dioctadecyl phosphate, phosphorous acid monoesters and phosphorous acid diesters; boric acid; and hydrochloric acid.

The form of the acid catalyst other than sulfur-containing compounds containing sulfur having an oxidation number of not less than +5 is not restricted, and may be either a solid acid catalyst or a liquid acid catalyst. Examples of the solid acid catalyst include natural minerals such as acid clay, kaolinite, bentonite, montmorillonite, talc, zirconium silicate and zeolite; oxides such as silica, alumina, titania and zirconia; oxide complexes such as silica alumina, silica magnesia, silica boria, alumina boria, silica titania and silica zirconia; chlorinated alumina; fluorinated alumina; and cation exchange resins.

In cases where polymerization of the poly(lactic acid) resin is carried out using a catalyst having stereoselective polymerizability and, as a raw material, a racemic body which is a mixture of the same amount of L-lactic acid and D-lactic acid, poly-L-lactic acid and poly-D-lactic acid can be produced at the same time.

To obtain a poly(lactic acid) resin having a high molecular weight and a high melting point, tin compounds, titanium compounds, lead compounds, zinc compounds, cobalt compounds, iron compounds, lithium compounds, rare earth compounds, antimony compounds, bismuth compounds, and sulfur-containing compounds containing sulfur having an oxidation number of not less than +5 are preferred and, in view of achieving high productivity, tin compounds, titanium compounds, lead compounds, zinc compounds, cobalt compounds, iron compounds, lithium compounds, rare earth compounds, sulfonic acid compounds, phosphorous compounds, and sulfur-containing compounds containing sulfur having an oxidation number of not less than +5 are more preferred. Tin compounds, titanium compounds, rare earth compounds, sulfur-containing compounds containing sulfur having an oxidation number of not less than +5, and phosphorous compounds are still more preferred. Further, to obtain a poly(lactic acid) resin having also excellent thermal stability and hue, the metal catalyst is still more preferably a tin organic carboxylate having two ligands, and is especially preferably a tin(II) acetate or tin(II) octanoate. Two or more of these may also be used in combination and, in cases where these are used in combination, it is preferred to use one or more selected from tin compounds and one or more selected from sulfur-containing compounds containing sulfur having an oxidation number of not less than +5.

To efficiently obtain a poly(lactic acid) resin having a high molecular weight and a high melting point, the amount of the sulfur-containing compound containing sulfur having an oxidation number of not less than +5 to be added is preferably 30 to 3,000 ppm, more preferably 35 to 2,700 ppm, still more preferably 40 to 2,500 ppm, especially preferably 45 to 2,200 ppm in terms of sulfur atoms, with respect to the raw material used (L-lactic acid, D-lactic acid and/or the like).

The timing of addition of the sulfur-containing compound containing sulfur having an oxidation number of not less than +5 as a catalyst is preferably at the beginning of the melt polymerization step or during the melt polymerization step in view of efficiently obtaining a poly(lactic acid) resin having a high molecular weight and a high melting point.

The amount of other catalysts to be added is not restricted, and is preferably 0.0001 to 2 parts by weight, more preferably 0.001 to 1 part by weight, still more preferably 0.005 to 0.5 part by weight, especially preferably 0.01 to 0.3 part by weight with respect to 100 parts by weight of the poly(lactic acid) resin.

The reaction conditions for the melt polymerization step are not restricted, and the step may be carried out under various conditions. The melt polymerization step is preferably carried out continuously under conditions containing at least the two stages described below:

Melt polymerization conditions 1: 140° C. to 160° C., 13.3 to 66.6 kPa

Melt polymerization conditions 2: 160° C. to 180° C., 1.3 to 6.5 kPa.

To efficiently obtain a poly(lactic acid) resin having a high molecular weight, the melt polymerization step is carried out preferably at a temperature of 140° C. to 180° C. and, to efficiently obtain a poly(lactic acid) resin also having a high melting point and excellent hue, the melt polymerization step is carried out preferably at a temperature of 145° C. to 175° C., more preferably at a temperature of 140° C. to 170° C., in terms of the substantial reaction temperature. The temperature during the melt polymerization step may be controlled either by a single stage process wherein the temperature is kept constant, or by a multistage process with two or more stages wherein the temperature is changed stepwise. To efficiently obtain a poly(lactic acid) resin having a high molecular weight and a high melting point, the temperature is preferably controlled by a multistage process with two or more stages. Examples of such a process include a method wherein the reaction is first allowed to proceed at a temperature of 140 to 160° C. and then at a temperature of 160 to 180° C.

To efficiently obtain a poly(lactic acid) resin having a high molecular weight, the melt polymerization step is carried out preferably at a pressure of 0.13 to 130 kPa and, to efficiently obtain a poly(lactic acid) resin also having excellent hue, the melt polymerization step is preferably carried out at a pressure of 1 to 100 kPa, more preferably carried out at a pressure of 10 to 90 kPa, still more preferably carried out at a pressure of 10 to 80 kPa, especially preferably carried out at a pressure of 20 to 70 kPa, in terms of the substantial reaction pressure. The pressure during the melt polymerization step may be controlled either by a single stage process wherein the pressure is kept constant, or by a multistage process with two or more stages wherein the pressure is changed stepwise. To efficiently obtain a poly(lactic acid) resin having a high molecular weight and excellent hue, the pressure is preferably controlled by a multistage process with two or more stages. Examples of such a process include a method wherein the reaction is first allowed to proceed at a pressure of 13.3 to 66.6 kPa and then at a pressure of 1.3 to 6.5 kPa. The reaction is also preferably carried out under the flow of an inert gas such as nitrogen.

The melt polymerization step is preferably carried out for a reaction time of 0.5 to 50 hours and, to efficiently obtain a poly(lactic acid) resin also having excellent hue, the melt polymerization step is preferably carried out for a reaction time of 1 to 45 hours, more preferably carried out for a reaction time of 2 to 40 hours, still more preferably carried out for a reaction time of 3 to 35 hours, especially preferably carried out for a reaction time of 4 to 30 hours. In cases where the temperature and the pressure during the melt polymerization step are controlled by a multistage process with two or more stages, examples of such a process include a method wherein the reaction is first allowed to proceed at a temperature of 140 to 160° C. at a pressure of 13.3 to 66.6 kPa for a reaction time of 2 to 15 hours and then at temperature of 160 to 180° C. at a pressure of 1.3 to 6.5 kPa for a reaction time of 2 to 15 hours. Even in the cases where the temperature and the pressure during the melt polymerization step are controlled by a multistage process with two or more stages, the total reaction time of the melt polymerization step is preferably 0.5 to 50 hours.

The melt polymerization step may be carried out by either a batch method or continuous method and, in cases of a batch method, the length of time for which the temperature is changed from room temperature to the substantial reaction temperature shown in the melt polymerization conditions 1 is preferably not more than 30%, more preferably not more than 20%, still more preferably not more than 10% of the length of time of the step. The length of time for which the pressure is changed from normal pressure to the substantial reaction pressure shown in the melt polymerization conditions 1 is preferably not more than 50%, more preferably not more than 40%, still more preferably not more than 30% of the length of time of the step.

The melt polymerization step may be carried out by either a batch method or continuous method, and the reactor is not restricted. Examples of the reactor which may be used include stirred tank reactors, mixer-type reactors, column reactors and extruder reactors. These reactors may be used as a combination of two or more of them. In view of the productivity, the step is preferably carried out by a continuous method.

The melt polymerization step may be carried out using any reaction apparatus and, to efficiently obtain a poly(lactic acid) resin having a high molecular weight and a high melting point as well as excellent thermal stability and hue, an apparatus in which a reactor is connected to a reflux condenser is preferably used.

The reactor may be constituted either by a single reaction chamber or by two or more reaction chambers separated by a divider(s) and/or the like. To efficiently obtain a poly(lactic acid) resin having a high molecular weight, the reactor is preferably constituted by two or more reaction chambers.

The reflux condenser preferably connects to the upper part of the reactor and, more preferably, a vacuum pump connects to the reflux condenser. The reflux condenser is used to separate volatile components, and any reflux condenser may be used as long as it has a vaporization section having a function to remove a part of the volatile components to the outside of the reaction system and a condensation section having a function to return a part of the volatile components into the reaction system. More specifically, any reflux condenser may be used as long as it removes water among the volatile components and returns lactic acid and lactide and/or their low-molecular-weight polymers into the reactor in the melt polymerization step. Examples of the condenser constituting the condensation section herein include those of the double-pipe type, multitubular type, coil type, plate type, plate fin type, centrifugal type, spiral type and jacket type.

In the melt polymerization step, the method of removal of the produced low-molecular-weight polymers from the reactor after the reaction is not restricted, and examples of the method include a method by extruding with an inert gas such as nitrogen and a method by removing with a gear pump or the like. From the viewpoint of ease of handling of the low-molecular-weight polymers having low viscosity, the method by extruding with an inert gas such as nitrogen is preferred.

The weight average molecular weight of the prepolymer produced by the melt polymerization step is 5,000 to 25,000, preferably 10,000 to 20,000. Further, when the acid value of the prepolymer is defined as a mol/ton, (2) below is preferably satisfied; (3) below is more preferably satisfied; and (4) below is still more preferably satisfied:

$$450/(Mw/10,000-0.14) < a < 950/(Mw/10,000-0.14) \quad (2)$$

(wherein Mw represents the weight average molecular weight of the prepolymer (×10,000))

$$500/(Mw/10,000-0.14) < a < 900/(Mw/10,000-0.14) \quad (3)$$

$$550/(Mw/10,000-0.14) < a < 850/(Mw/10,000-0.14) \quad (4).$$

The weight average molecular weight is the value of weight average molecular weight in terms of a poly(methyl methacrylate) standard as measured by gel permeation chromatography (GPC) using hexafluoroisopropanol as a solvent, and the acid value a is the amount of carboxyl termini as measured by neutralization titration with an alkaline solution.

The crystallization step is described below.

To carry out the solid-phase polymerization step, crystallization of the prepolymer is necessary. Therefore, a crystallization treatment is carried out after completion of the melt polymerization step before the beginning of the solid-phase polymerization step.

Examples of the method of crystallization include a method wherein heat treatment is carried out in a gas phase such as nitrogen or air, or in a liquid phase such as water or ethanol, at a crystallization treatment temperature; a method wherein the prepolymer is dissolved in a solvent to prepare a solution, followed by evaporating the solvent; a method wherein the prepolymer is contacted with a solvent; and a method wherein the prepolymer in the molten state is subjected to an operation of extension or shear, followed by cooling and solidifying the prepolymer. Among the above methods, the method wherein heat treatment is carried out in the nitrogen gas phase and the method wherein the prepolymer in the molten state is subjected to an operation of extension or shear, followed by cooling and solidifying the prepolymer are preferred. A plurality of the above methods may also be used in combination.

In the method wherein the prepolymer in the molten state is subjected to an operation of extension or shear, followed by cooling and solidifying the prepolymer, the method of cooling is preferably water cooling wherein the length of time of contacting with water is preferably not more than 10 minutes, more preferably not more than 5 minutes, still more preferably not more than 3 minutes, preferably not more than 1 minute, especially preferably not more than 30 seconds. In cases where the length of time of contacting with water is within the preferred range described above, acidic compounds are unlikely to increase in the polymer. The length of time from the cooling until the solid-phase polymerization is preferably not more than 12 hours, more preferably not more than 6 hours, still more preferably not more than 3 hours, especially preferably not more than 1 hour.

The crystallization treatment temperature herein is not restricted as long as the temperature is higher than the glass-transition temperature and lower than the melting point of the prepolymer which can be obtained by the melt polymerization step. The crystallization treatment temperature is more preferably between the heating crystallization temperature and the cooling crystallization temperature as measured by differential scanning calorimetry (DSC) in advance. In cases where the poly(lactic acid) resin is a poly(lactic acid) resin, to efficiently obtain a poly(lactic acid) resin having a high molecular weight and a high melting point as well as excellent hue, the crystallization treatment temperature is preferably 70 to 130° C., more preferably 75 to 130° C., most preferably 80 to 130° C.

The temperature during the crystallization step may also be controlled by a single stage process wherein the temperature is kept constant. However, the temperature is preferably controlled by a multistage process with two or more stages wherein the temperature is changed stepwise, and the temperature is more preferably increased stepwise as the reaction proceeds. Examples of such a process include a method wherein the reaction is first allowed to proceed at a temperature of 80 to 100° C. and then at a temperature of 100 to 130° C. The amount of increase in the temperature at each stage is preferably not more than 30° C., more preferably not more than 25° C., still more preferably not more than 20° C.

The length of time of crystallization is preferably 1 to 7 hours, more preferably 1.5 to 5 hours, especially preferably 1.5 to 3 hours. In terms of the pressure conditions during the crystallization step, any of the conditions of reduced pressure, normal pressure and increased pressure may be employed. Among these, normal pressure is preferred. The crystallization is preferably carried out under an anhydrous atmosphere and, in cases where the crystallization is carried out under an atmosphere containing moisture, the crystallization time is preferably as short as possible.

In cases where the temperature during the crystallization step is controlled by a multistage process with two or more stages, examples of such a process include a method wherein the first stage is carried out at a temperature of 70 to 100° C. for 1 to 4 hours and the second stage is carried out at a temperature of 100 to 130° C. for 1 to 4 hours. The process is more preferably carried out by a method wherein the first stage is carried out at a temperature of 70 to 90° C. for 1 to 3 hours, the second stage is carried out at a temperature of 90 to 110° C. for 1 to 3 hours, and the third stage is carried out at a temperature of 110 to 130° C. for 1 to 3 hours. Even in cases where the temperature is controlled by a multistage process with two or more stages, the total reaction time of the crystallization step is preferably 1 to 7 hours.

Instead of increasing the temperature stepwise as described above by a multistage process wherein the temperature is kept constant at each stage, the temperature may also be increased continuously. Examples of such a process include a method wherein the temperature is first increased from 70° C. to 120° C. for 2 hours, that is, at a rate of 25° C. per hour, and then kept constant at 160° C. In cases where the temperature is continuously increased, the temperature increasing rate is preferably not more than 30° C. per hour.

The form of the prepolymer for the crystallization treatment is not restricted, and the prepolymer may be in the form of any of a mass, film, pellet, powder and the like. The prepolymer is preferably in the form of a pellet or powder for efficient crystallization. The pellet means a small molded particle of a polymer having a maximum diameter of about 1 to 10 mm, especially about 1.2 to 8 mm, and about 1.5 to 6 mm in most cases, with a ball shape, prolate spheroid shape, flat ball shape, plate shape, rod shape, shape similar to these, amorphous shape or another arbitrary shape. The pellet is also called a "chip." Examples of the method of pelletization include a method wherein the prepolymer in the molten state is extruded into a strand-like shape and pelletized using a pelletizer, a method wherein the prepolymer is dropped in the form of a droplet using a drip nozzle and brought into contact with a solid, gas or liquid to achieve pelletization, and a method wherein the prepolymer is extruded from a die into a gas or liquid while the extruded prepolymer is cut. The pelletization is preferably carried out under a dry atmosphere and, in cases where the prepolymer is brought into contact with moisture, the length of time of contact is preferably as short as possible.

Examples of the method of forming the prepolymer into a powder include a method wherein the prepolymer is pulverized using a mixer, blender, ball mill or hammer pulverizer. In the case of a powder, in view of efficient crystallization, the average particle diameter is preferably 0.01 to 5 mm, more preferably 0.1 to 1 mm.

Industrially, the prepolymer is usually formed into a pellet. An excellent productivity and high effect can be achieved especially in cases where the crystallization treatment is carried out for a prepolymer in the form of a pellet.

The weight average molecular weight of the crystallized prepolymer is 5,000 to 25,000, preferably 10,000 to 20,000, especially preferably 12,000 to 20,000. The weight average molecular weight immediately after melt polymerization hardly changes even through the crystallization step. In polylactic acid, in contrast to findings for conventional polyesters, a high weight average molecular weight leads to low reactivity in solid-phase polymerization and a low final molecular weight, while a too low weight average molecular weight leads to requirement of a low solid-phase polymerization temperature for prevention of melting during solid-phase polymerization, resulting in decreased productivity. By using a prepolymer having a molecular weight within the above-described range, high productivity can be achieved.

The enthalpy of fusion $\Delta Hm$ of the crystallized prepolymer is 50 to 65 J/g, more preferably 53 to 60. In conventional solid-phase polymerization, it has been suggested that a high degree of crystallinity, that is, high enthalpy of fusion, leads to low reactivity in the so lid-phase polymerization, but, in our method, as the enthalpy of fusion increases, the reactivity in the solid-phase polymerization increases. In cases where the enthalpy of fusion $\Delta Hm$ of the crystallized prepolymer is within the above-described preferred range, the reactivity in the solid-phase polymerization can be kept high while a high degree of crystallinity can be achieved.

The acid value A mol/ton of the crystallized prepolymer needs to satisfy (1) below, preferably satisfies (5) below, more preferably satisfies (6) below. In cases where the acid value is too high, degradation is promoted during the solid-phase polymerization step, while in cases where the acid value is too low, the reactivity is low so that a high molecular weight and a high melting point can be hardly achieved. The acid value is derived from terminal carboxyl groups of the polymer and oligomers such as dimers, and acidic compounds such as lactic acid, and the amount of terminal carboxyl groups of the polymer is dependent on the molecular weight. In particular, in cases where too much acidic compounds are contained, degradation occurs during the solid-phase polymerization, so that the acid value is preferably low, while in cases where the value is too low, the polymerization reactivity is low. We discovered that high productivity can be obtained when the following inequalities are satisfied:

$$450/(Mw/10{,}000-0.14) < A < 950/(Mw/10{,}000-0.14) \quad (1)$$

(wherein Mw represents the weight average molecular weight of the crystallized prepolymer)

$$500/(Mw/10{,}000-0.14) < A < 900/(Mw/10{,}000-0.14) \quad (5)$$

$$550/(Mw/10{,}000-0.14) < A < 850/(Mw/10{,}000-0.14) \quad (6).$$

The lactide content L is preferably 0.1 to 3.0 wt %, more preferably 0.5 to 2.5 wt %. In cases where the lactide content is within the preferred range, the molecular mobility of the polymer is high, and generation of acidic compounds due to degradation can be prevented.

When the crystallized prepolymer is poly-L-lactic acid or poly-D-lactic acid, in the case of poly-L-lactic acid, the D-lactic acid content d is preferably 0.2 to 2.0 mol % and, in the case of poly-D-lactic acid, the L-lactic acid content 1 is preferably 0.2 to 2.0 mol %, more preferably 0.3 to 1.5 mol %.

The enthalpy of fusion ΔHm means the enthalpy of the melting peak upon temperature increase as measured by differential scanning calorimetry (DSC); the acid value A of the crystallized prepolymer means the amount of terminal carboxyl groups as measured by neutralization titration with an alkaline solution; the lactide content means the content in the prepolymer as measured by proton NMR; and the D-lactic acid content d and the L-lactic acid content 1 mean the contents in the total lactic acid component as measured by liquid chromatography.

The solid-phase polymerization step is described below.

The solid-phase polymerization step is preferably continuously carried out under conditions including at least the following two stages:

Solid-phase polymerization conditions 1: 130° C. to 155° C.
Solid-phase polymerization conditions 2: 155° C. to 165° C.

The solid-phase polymerization step is preferably carried out at a temperature of not more than the melting point of the prepolymer and, in view of efficiently obtaining a poly(lactic acid) resin having a high molecular weight and a high melting point as well as excellent hue, the solid-phase polymerization step is preferably carried out at a temperature of 130 to 165° C., more preferably carried out at a temperature of 135 to 165° C., still more preferably carried out at a temperature of 140 to 165° C. In particular, the final temperature is preferably 155 to 165° C., more preferably 160 to 165° C.

The temperature during the solid-phase polymerization step may be controlled either by a single stage process or by a multistage process with two or more stages and, in view of achieving a high molecular weight and excellent hue in a short time, the temperature is preferably controlled by a multistage process with two or more stages, and the temperature is more preferably increased stepwise as the reaction proceeds. Examples of such a process include a method wherein the reaction is first allowed to proceed at a temperature of 130 to 155° C. and then at a temperature of 155 to 165° C. The amount of increase in the temperature at each stage is preferably not more than 15° C., more preferably not more than 10° C., still more preferably not more than 5° C.

To efficiently obtain a poly(lactic acid) resin having a high molecular weight and a high melting point as well as excellent thermal stability and hue, the solid-phase polymerization step is preferably carried out for a reaction time of 1 to 100 hours and, to efficiently obtain a poly(lactic acid) resin also having excellent hue, the solid-phase polymerization step is preferably carried out for a reaction time of 3 to 80 hours, more preferably carried out for a reaction time of 5 to 50 hours, still more preferably carried out for a reaction time of 10 to 30 hours.

In cases where the temperature during the solid-phase polymerization step is controlled by a multistage process with two or more stages, examples of such a process include a method wherein the first stage is carried out at a temperature of 130 to 150° C. for 1 to 50 hours and the second stage is carried out at a temperature of 150 to 165° C. for 1 to 50 hours. To easily achieve a high molecular weight in a short time and obtain excellent hue, the process is more preferably carried out by a method wherein the first stage is carried out at a temperature of 120 to 140° C. for 1 to 10 hours, the second stage is carried out at a temperature of 140 to 155° C. for 1 to 10 hours, and the third stage is carried out at a temperature of 155 to 165° C. for 10 to 30 hours. Even in cases where the temperature is controlled by a multistage process with two or more stages, the total reaction time of the solid-phase polymerization step is preferably 1 to 100 hours.

Instead of increasing the temperature stepwise as described above by a multistage process wherein the temperature is kept constant at each stage, the temperature may also be increased continuously. Examples of such a process include a method wherein the temperature is first increased from 140° C. to 160° C. for 20 hours, that is, at a rate of 1° C. per hour, and then kept constant at 160° C. In cases where the temperature is continuously increased, the temperature increasing rate is preferably not more than 10° C. per hour.

The pressure conditions in the solid-phase polymerization step are not restricted, and any of the conditions of reduced pressure, normal pressure and increased pressure may be employed. To efficiently obtain a poly(lactic acid) resin having a high molecular weight, the pressure conditions are preferably reduced pressure conditions or normal pressure conditions. In cases where the step is carried out under reduced pressure conditions, the step is preferably carried out at a pressure of 0.13 to 1,300 Pa. Further, the step is preferably carried out at a pressure of 1 to 1,000 Pa, more preferably carried out at a pressure of 10 to 900 Pa, still more preferably carried out at a pressure of 100 to 800 Pa, especially preferably carried out at a pressure of 500 to 700 Pa. The pressure during the solid-phase polymerization step may be controlled either by a single stage process or by a multistage process with two or more stages, and is preferably controlled by a multistage process with two or more stages. Examples of such a process include a method wherein the reaction is first allowed to proceed at a pressure of 700 to 1,300 Pa and then at a pressure of 0.13 to 700 Pa. In cases where the reaction is carried out under normal pressure conditions, the reaction is preferably carried out under the flow of an inert gas such as dry nitrogen. The flow rate is preferably 0.01 to 200 L/min., more preferably 0.1 to 150 L/min., especially preferably 0.5 to 100 L/min. per 1 kg of the prepolymer.

The form of the crystallized prepolymer used for the solid-phase polymerization step is not restricted, and the crystallized prepolymer may be in the form of any of a mass, film, pellet, powder and the like. The form of a pellet or powder is preferred. The pellet means a small molded particle of a polymer having a maximum diameter of about 1 to 10 mm, especially about 1.2 to 8 mm, and about 1.5 to 6 mm in most cases, with a ball shape, prolate spheroid shape, flat ball shape, plate shape, rod shape, shape similar to these, amorphous shape or another arbitrary shape. The pellet is also called a chip. In the case of a powder, in view of efficient solid-phase polymerization, the average particle diameter is preferably 0.01 to 5 mm, more preferably 0.1 to 1 mm. Industrially, the prepolymer is usually formed into a pellet. An excellent productivity and high effect can be achieved especially in cases where the solid-phase polymerization is carried out for a prepolymer in the form of a pellet.

The solid-phase polymerization step may be either a batch method or continuous method, and examples of the reactor which may be used include stirred tank reactors, mixer-type reactors and column reactors. These reactors may be used as a combination of two or more of them. In view of the productivity, the step is preferably carried out by a continuous method.

The weight average molecular weight of the poly(lactic acid) resin obtained by the method is not restricted, and is preferably not less than 100,000 in view of the mechanical properties. In particular, for excellent moldability and mechanical properties, the weight average molecular weight is preferably 100,000 to 1200,000, more preferably 120,000 to 300,000, still more preferably 140,000 to 250,000. The weight average molecular weight is the value of weight average molecular weight in terms of a poly(methyl methacrylate) standard as measured by gel permeation chromatography (GPC) using hexafluoroisopropanol as a solvent.

The ratio of the weight average molecular weight with respect to the number average molecular weight is preferably 1.4 to 3 in view of uniformity of the physical properties of the polymer, and the ratio is more preferably 1.5 to 2.5. The rate of reduction in the weight after heating under nitrogen gas flow at 200° C. for 20 minutes is preferably not more than 0.6% in view of excellent heat resistance, and the rate is more preferably not more than 0.4%.

The content of the sulfur-containing compound containing sulfur having an oxidation number of not less than +5 after the solid-phase polymerization is preferably 10 to 4,000 ppm, more preferably 30 to 3,000 ppm, still more preferably 40 to 2,000 ppm, especially preferably 50 to 500 ppm in terms of sulfur atoms, with respect to the produced polymer.

The residual rate of the sulfur-containing compound containing sulfur having an oxidation number of not less than +5 after the solid-phase polymerization is preferably 0 to 90%, more preferably 1 to 50%, especially preferably 5 to 30%. The residual rate (R) is an index of the difference between the concentrations, before and after the polymerization reaction, of the sulfur-containing compound containing sulfur having an oxidation number of not less than +5, and is represented by the Equations (7) to (9) below:

$$R[\%]=Ca[\text{ppm}]/Cb[\text{ppm}]\times 100 \quad (7)$$

(Cb, theoretical catalyst concentration calculated according to Equation (8), which is expected when all catalyst added is remaining in the polymer; Ca, actual concentration of the catalyst remaining in the polymer after the polymerization reaction which is calculated according to Equation (9))

$$Cb[\text{ppm}]=Wb[\text{g}]/Wp[\text{g}]\times 10^6 \quad (8)$$

(Wb, weight of the catalyst added in the polymerization step; Wp, weight of the polymer after the polymerization reaction)

$$Ca[\text{ppm}]=Wa[\text{g}]/Wp[\text{g}]\times 10^6 \quad (9)$$

(Wb, weight of the catalyst in the polymer after the polymerization reaction; Wp, weight of the polymer after the polymerization reaction).

In cases where a tin compound(s), titanium compound(s), lead compound(s), zinc compound(s), cobalt compound(s), iron compound(s), lithium compound(s) and/or rare earth compound(s) is/are used, the ratio of the molar amount of sulfur atoms of the sulfur-containing compound containing sulfur having an oxidation number of not less than +5 with respect to the total molar amount of the metals after the solid-phase polymerization is preferably 3.0 to 50 in view of the interaction between the metal compounds and the sulfur-containing compound containing sulfur having an oxidation number of not less than +5. The ratio is more preferably 4.0 to 40.

To obtain an aliphatic polyester having excellent thermal stability, a stabilizer is preferably added at the beginning of the melt polymerization step, during the melt polymerization step or after the solid-phase polymerization.

Examples of the stabilizer include sulfur-containing compounds containing sulfur having an oxidation number of less than +5, phosphorous compounds, aromatic ketone compounds, hydrocarbon compounds having an aromatic ring(s), aliphatic dicarboxylic acids; aliphatic diols, alicyclic hydrocarbon compounds, hindered phenol compounds, vitamin compounds, triazole compounds and hydrazine derivative compounds. These may also be used in combination.

Specific examples of the sulfur-containing compounds containing sulfur having an oxidation number of less than +5 include diphenyl sulfone, ditolyl sulfone, dibenzyl sulfone, methyl phenyl sulfone, ethyl phenyl sulfone, propyl phenyl sulfone, methyl tolyl sulfone, ethyl tolyl sulfone, propyl phenyl sulfone, benzyl phenyl sulfone, phenyl tolyl sulfone, benzyl tolyl sulfone, bis(phenylsulfonyl)methane, bis(tolylsulfonyl)methane, bis(benzylsulfonyl)methane, sulfurous acid, sodium sulfite, potassium sulfite, sulfur, dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecylthiopropionate), pentaerythritol-tetrakis(3-myristylthiopropionate) and pentaerythritol-tetrakis(3-stearylthiopropionate). Specific examples of trade names of the sulfur-containing compounds containing sulfur having an oxidation number of less than +5 include "Adekastab" AO-23, AO-4125 and AO-503A manufactured by ADEKA; "Irganox" PS802 manufactured by Ciba Specialty Chemicals; "Sumilizer" TPL-R, TPM, TPS and TP-D manufactured by Sumitomo Chemical Co., Ltd.; DSTP, DLTP, DLTOIB and DMTP manufactured by API Corporation; "Seenox" 412S manufactured by Shipro Kasei; and "Cyanox" 1212 manufactured by Cyanamid Inc.

Among the phosphorous compounds, examples of organic phosphorous compounds include phosphite compounds and phosphate compounds. Specific examples of such phosphite compounds include tetrakis[2-t-butyl-4-thio(2'-methyl-4'-hydroxy-5'-t-butylphenyl)-5-methylphenyl]-1,6-hexamethylene-bis(N-hydroxyethyl-N-methylsemicarbazide)-diphosphite, tetrakis[2-t-butyl-4-thio(2'-methyl-4'-hydroxy-5'-t-butylphenyl)-5-methylphenyl]-1,10-decamethylene-di-carboxylic acid-di-hydroxyethylcarbonylhydrazide-diphosphite, tetrakis[2-t-butyl-4-thio(2'-methyl-4'-hydroxy-5'-t-butylphenyl)-5-methylphenyl]-1,10-decamethylene-di-carboxylic acid-di-salicyloylhydrazide-diphosphite, tetrakis [2-t-butyl-4-thio(2'-methyl-4'-hydroxy-5'-t-butylphenyl)-5-methylphenyl]-di(hydroxyethylcarbonyl)hydrazide-diphosphite and tetrakis[2-t-butyl-4-thio(2'-methyl-4'-hydroxy-5'-t-butylphenyl)-5-methylphenyl]-N,N'-bis (hydroxyethyl)oxamide-diphosphite. The phosphite compound preferably has at least one P—O bond linked to an aromatic group. Specific examples of such a compound include tris(2,4-di-t-butyl-phenyl)phosphite, tetrakis(2,4-di-t-butylphenyl)4,4'-biphenylenephosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octylphosphite, 4,4'- butylidene-bis(3-methyl-6-t-butylphenyl-di-tridecyl) phosphite, 1,1,3-tris(2-methyl-4-ditridecylphosphite-5-t-butyl-phenyl)butane, tris (mixed mono- and di-nonylphenyl) phosphite, tris(nonylphenyl)phosphite and 4,4'-isopropylidenebis(phenyl-dialkylphosphite). Tris(2,4-di-t-butylphenyl)phosphite, 2,2-methylenebis(4,6-di-t-butylphenyl)octylphosphite, bis(2,6-di-t-butyl-4-methylphenyl)pentaerythritol-di-phosphite, tetrakis(2,4-di-t-butylphenyl)-4,4'-biphenylenephosphonite, 9,10-dihydro-9-oxa-10-phosphaphenanthrene-10-oxide, triisodecyl phosphite and the like are preferably used. Specific examples of trade names of the phosphite compounds include "Adekastab" C, PEP-4C, PEP-8, PEP-11C, PEP-24G, PEP-36, HP-10, 2112, 260, 522A, 329A, 1178, 1500, C, 135A, 3010 and TPP manufactured by ADEKA; "Irgafos" 168 manufactured by Ciba Specialty Chemicals; "Sumilizer" P-16 manufactured by Sumitomo Chemical Co., Ltd.; "Sandostab" P-EPQ manufactured by Clariant Ltd.; "Weston" 618, 619G and 624 manufactured by GE; and SANKO-HCA manufactured by Sanko Co., Ltd.

Specific examples of the phosphate compounds include monostearyl acid phosphate, distearyl acid phosphate, methyl acid phosphate, isopropyl acid phosphate, butyl acid phosphate, octyl acid phosphate and isodecyl acid phosphate and, among these, monostearyl acid phosphate and distearyl acid phosphate are preferred. Specific examples of trade names of the phosphate compounds include "Irganox" MD1024 manufactured by Ciba Specialty Chemicals; "Inhibitor" OABH manufactured by Eastman Kodak Company; and "Adekastab" CDA-1, CDA-6 and AX-71 manufactured by ADEKA Corporation.

Among the phosphorous compounds, examples of inorganic phosphorous compounds include phosphate compounds, phosphite compounds and hypophosphite compounds. Specific examples of such phosphate compounds include phosphoric acid, diphosphoric acid, triphosphoric acid, lithium phosphate, beryllium phosphate, sodium phosphate, magnesium phosphate, aluminum phosphate, potassium phosphate and calcium phosphate; specific examples of such phosphite compounds include phosphorous acid, lithium phosphite, beryllium phosphite, sodium phosphite, magnesium phosphite, aluminum phosphite, potassium phosphite and calcium phosphite; and specific examples of such hypophosphite compounds include hypophosphorous acid, lithium hypophosphite, beryllium hypophosphite, sodium hypophosphite, magnesium hypophosphite, aluminum hypophosphite, potassium hypophosphite and calcium hypophosphite.

Specific examples of the aromatic ketone compounds include 1,4-dibenzoylbenzene, benzophenone, acetophenone, propiophenone and benzoylnaphthalene.

Specific examples of the hydrocarbon compounds having an aromatic ring(s) include triphenylmethane, diphenylmethane and toluene.

Specific examples of the aliphatic dicarboxylic acids include oxalic acid, succinic acid, butanoic acid, adipic acid and pentanoic acid.

Specific examples of the aliphatic diols include ethylene glycol, propanediol, butanediol, pentanediol, hexanediol, cyclohexanediol, spiroglycol and isosorbide.

Specific examples of the alicyclic hydrocarbon compounds include 1,2-dimethylcyclohexane, methylcyclohexane, 1,2,4-trimethylcyclohexane, 1,2-diethylcyclohexane, ethylcyclohexane, 1,2,4-triethylcyclohexane, 1,2-dipropylcyclohexane, propylcyclohexane and 1,2,4-tripropylcyclohexane.

Specific examples of the hindered phenol compounds include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], 2,2'-methylenebis-(4-methyl-t-butylphenol), triethylene glycol-bis-[3-(3-t-butyl-5-methyl-4-hydroxyphenyl)-propionate], tetrakis[methylene-3-(3',5'-di-t-butyl-4'-hydroxyphenyl) propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4'-hydroxyphenyl)propionylhexamethylenediamine, N,N'-tetramethylene-bis-3-(3'-methyl-5'-t-butyl-4'-hydroxyphenol)propionyldiamine, N,N'-bis-[3-(3,5-di-t-butyl-4-hydroxyphenol)propionyl]hydrazine, N-salicyloyl-N'-salicylidenehydrazine, 3-(N-salicyloyl)amino-1,2,4-triazole, N,N'-bis[2-{3-(3,5-di-t-butyl-4-hydroxyphenyl)propionyloxy}ethyl]oxyamide, pentaerythrityl-tetrakis[3-(3,5-di-t-butyl-4-hydroxyphenyl)propionate] and N,N'-hexamethylenebis-(3,5-di-t-butyl-4-hydroxy-hydrocinnamide. Preferred examples of the hindered phenol compounds include triethylene glycol-bis-[3-(3-t-butyl-5-methyl-4-hydroxyphenyl)-propionate], tetrakis[methylene-3-(3',5'-di-t-butyl-4'-hydroxyphenyl) propionate]methane, 1,6-hexanediol-bis-[3-(3,5-di-t-butyl-4-hydroxyphenyl)-propionate], pentaerythrityl-tetrakis[3-(3,5-di-t-butyl-4-hydroxyphenyl)propionate] and N,N'-hexamethylenebis-(3,5-di-t-butyl-4-hydroxy-hydrocinnamide). Specific examples of trade names of the hindered phenol compounds include "Adekastab" AO-20, AO-30, AO-40, AO-50, AO-60, AO-70, AO-80 and AO-330 manufactured by ADEKA Corporation; "Irganox" 245, 259, 565, 1010, 1035, 1076, 1098, 1222, 1330, 1425, 1520, 3114 and 5057 manufactured by Ciba Specialty Chemicals; "Sumilizer" BHT-R, MDP-S, BBM-S, WX-R, NW, BP-76, BP-101, GA-80, GM and GS manufactured by Sumitomo Chemical Co., Ltd.; and "Cyanox" CY-1790 manufactured by Cyanamid Inc.

Specific examples of the vitamin compounds include natural compounds such as d-α-tocopherol acetate, d-α-tocopherol succinate, d-α-tocopherol, d-β-tocopherol, d-γ-tocopherol, d-δ-tocopherol, d-α-tocotrienol, d-β-tocophetrienol, d-γ-tocophetrienol and d-δ-tocophetrienol; and synthetic compounds such as dl-α-tocopherol, dl-α-tocopherol acetate, dl-α-tocopherol calcium succinate and dl-α-tocopherol nicotinate. Specific examples of trade names of the vitamin compounds include "Tocopherol" manufactured by Eisai Co., Ltd. and "Irganox" E201 manufactured by Ciba Specialty Chemicals.

Specific examples of the triazole compounds include benzotriazole and 3-(N-salicyloyl)amino-1,2,4-triazole.

Specific examples of the hydrazine derivative compounds include decamethylenedicarboxylic acid-bis(N'-salicyloylhydrazide), isophthalic acid bis(2-phenoxypropionylhydrazide), N-formyl-N'-salicyloylhydrazine, 2,2-oxamidobis-[ethyl-3-(3,5-di-t-butyl-4-hydroxyphenyl)propionate], oxalyl-bis-benzylidene-hydrazide, nickel-bis(1-phenyl-3-methyl-4-decanoyl-5-pyazolate), 2-ethoxy-2'-ethyloxanilide, 5-t-butyl-2-ethoxy-2'-ethyl-oxanilide, N,N-diethyl-N',N'-diphenyloxamide, N,N'-diethyl-N,N'-diphenyloxamide, oxalic acid-bis(benzylidenehydrazide), thiodipropionic acid-bis(benzylidenehydrazide), bis(salicyloylhydrazine), N-salicylidene-N'-salicyloylhydrazone, N,N'-bis[3-(3,5-di-t-butyl-4-hydroxyphenyl)propionyl]hydrazine and N,N'-bis[2-{3-(3,5-di-t-butyl-4-hydroxyphenyl)propionyloxy}ethyl] oxamide.

Among the above examples, those having no t-butyl group are preferred. In particular, at least one selected from sulfur-containing compounds containing sulfur having an oxidation number of less than +5, phosphorous compounds, aromatic ketone compounds, hydrocarbon compounds having an aromatic ring(s), aliphatic dicarboxylic acids, aliphatic diols and alicyclic hydrocarbon compounds is preferably contained. Preferred sulfur-containing compounds containing sulfur having an oxidation number of less than +5 are diphenylsulfone, sulfurous acid, sodium sulfite and sulfur, and "Sumilizer" TPD (pentaerythritol tetrakis(β-laurylthio-propionate)) manufactured by Sumitomo Chemical Co., Ltd. Among the phosphorous compounds, more preferred inorganic phosphorous compounds are phosphoric acid compounds and phosphorous acid compounds, and more preferred organic phosphorous compounds are phosphate compounds and phosphite compounds. More preferred specific examples of the phosphorous compounds include inorganic phosphorous compounds such as phosphoric acid, phosphorous acid, sodium phosphate and sodium phosphite; and organic phosphorous compounds such as "Adekastab" AX-71 (dioctadecyl phosphate), PEP-8 (distearyl pentaerythritol diphosphite), PEP-36 (cyclic neopentatetraylbis(2,6-t-butyl-4-methylphenyl)phosphite), HP-10 (2,2'-methylenebis (4,6-di-t-butyl-1-phenyloxy)(2-ethylhexyloxy) phosphorous), PEP-24G (bis(2,4-di-t-butylphenyl) pentaerythritol diphosphite), 3010 (triisodecyl phosphite) and TPP (triphenyl phosphite) manufactured by ADEKA Corporation; "Irgafos" 168 (tris(2,4-di-t-butylphenyl)phosphite) manufactured by Ciba Specialty Chemicals; and HCA (9,10-dihydro-9-oxa-10-phosphaphenanthrene-10-oxide) manufactured by Sanko Co., Ltd. In particular, phosphorous compounds having a phosphorus atom(s) directly bound to a carbon atom(s) constituting an aromatic ring(s) are preferred, and HCA (9,10-dihydro-9-oxa-10-phosphaphenanthrene-10-oxide) manufactured by Sanko Co., Ltd. is especially preferred.

As the aromatic ketone compound, 1,4-dibenzoylbenzene and benzophenone are especially preferred; as the hydrocarbon compound having an aromatic ring(s), triphenylmethane is especially preferred; as the aliphatic dicarboxylic acid, oxalic acid is especially preferred; as the aliphatic diol, hexanediol is especially preferred; and, as the alicyclic hydrocarbon compound, 1,2-dimethylcyclohexane is especially preferred.

The amount of the stabilizer to be added is not restricted and, in view of achieving excellent thermal stability, the amount is preferably 0.001 to 2 parts by weight, more preferably 0.01 to 1 part by weight, still more preferably 0.05 to 0.5 part by weight, most preferably 0.08 to 0.3 part by weight with respect to 100 parts by weight of the poly(lactic acid) resin. The timing of addition of the stabilizer is not restricted, and may be either before the beginning or after the completion of either the melt polymerization step or the solid-phase polymerization step. In cases where the stabilizer is added at the stage of the melt polymerization step in view of obtaining a poly(lactic acid) resin having a high melting point and a high molecular weight, the stabilizer is preferably added immediately before the completion of the above-described melt polymerization conditions 1 (140° C. to 160° C., 13.3 to 66.6 kPa) or at the beginning of the above-described melt polymerization conditions 2 (160° C. to 180° C., 1.3 to 6.5 kPa), more preferably added both immediately before the completion of the melt polymerization conditions 1 and at the beginning of the melt polymerization conditions 2 from the viewpoint of achieving excellent productivity. In cases where the stabilizer is added at the beginning of the melt polymerization conditions 2, the catalyst for solid-phase polymerization is preferably added after the addition of the stabilizer. In cases where the stabilizer is added at the stages of both the melt polymerization conditions 1 and the melt polymerization conditions 2, the stabilizer is preferably added in an amount of 0.001 to 1 part by weight at each stage and, in view of achieving excellent productivity, the stabilizer is more preferably added in an amount of 0.01 to 0.5 part by weight at each stage, still more preferably added in an amount of 0.01 to 0.1 part by weight at each stage with respect to 100 parts by weight of the poly(lactic acid) resin.

To obtain a poly(lactic acid) resin having excellent thermal stability, the stabilizer may also be preferably added after the completion of the solid-phase polymerization step. In this case, the method of addition of the stabilizer is not restricted, and examples of the method include a method wherein melt kneading is carried out at a temperature higher than the melting point of the poly(lactic acid) resin and a method wherein the stabilizer is dissolved in a solvent and the resulting solution is mixed, followed by removal of the solvent. For efficient production, the method wherein melt kneading is carried out at a temperature higher than the melting point of the poly(lactic acid) resin is preferred. The method of melt kneading may be either a batch method or continuous method, and examples of the apparatus which may be used include single screw extruders, twin screw extruders, multi-screw extruders, plastomill, kneaders and stirred tank reactors equipped with a pressure reducing device. For efficient uniform kneading, a single screw extruder or twin screw extruder is preferably used. The temperature at which the stabilizer is added is preferably a temperature of 180 to 250° C. and, to achieve excellent mechanical properties, a temperature of 190 to 230° C. is more preferred. The pressure at which the stabilizer is added may be any of a reduced pressure, normal pressure and increased pressure. To remove gas generated during melt kneading, the pressure is preferably a reduced pressure. In terms of the atmospheric conditions during the melt kneading, the melt kneading may be carried out either in the air or under an atmosphere of an inert gas such as nitrogen. To reduce the amount of gas generated during the melt kneading, the melt kneading is preferably carried out under an atmosphere of an inert gas.

In cases where the mixing is carried out in a solvent, a solvent that dissolves the polymer and monomers is used. Examples of the solvent which may be used include chloroform, methylene chloride and acetonitrile. In cases where the solvent needs to be removed after the mixing, the method of removing the solvent is not restricted, and examples of the method which may be used include a method wherein the solvent is evaporated at room temperature and a method wherein the solvent is evaporated under reduced pressure at a temperature higher than the boiling point of the solvent.

To further improve hydrolysis resistance, at least one selected from amine compounds, alkali metal compounds and alkaline earth metal compounds is preferably added at the beginning of the melt polymerization step or after the completion of the solid-phase polymerization step, or at any stage therebetween. By this, in cases where a polymerization catalyst, especially a catalyst having an acid, is remaining, hydrolysis of the poly(lactic acid) resin during the melt kneading and the melt molding by the remaining catalyst can be suppressed and the hydrolysis resistance can thus be increased.

Specific examples of the amine compounds include methylethylamine, triethylamine, dimethylpropylamine, ethylamine, isoamylamine, butylamine, propylamine, ethylenediamine, butanediamine, hexamethylenediamine, 1,2,3-triaminopropane, tetraethylammonium hydroxide, aniline, naphthylamine, naphthalenediamine, cyclohexanediamine, benzenediamine, benzidine, diaminodiphenylether, diaminodiphenylmethane, dibenzylamine, didodecylamine, pyrimidine, 2-aminopyrimidine, 2-amino-4-methyl-6-methoxypyrimidine, pyrimidine-2,4,6-triamine, N-(2-aminoethyl)-N-pyrimidine-2-ylamine, 6-t-butylpyrimidine-4-amine, 4,6-dimethoxy-5-phenylpyrimidine-2-amine, 2-ethoxypyrimidine-4,6-diamine, 5-phenylpyrimidine-4-amine3,9-bis[2-(3,5-diamino-2,4,6-triazaphenyl)ethyl]-2,4,8,10-tetraoxaspiro[5.5]undecane, ethylenediamine-tetraacetic acid, alkali metal (Li, Na, K) salts of ethylenediamine-tetraacetic acid, N,N'-disalicylidene-ethylenediamine, N,N'-disalicylidene-1,2-propylenediamine, N,N''-disalicylidene-N'-methyl-dipropylenetriamine, 3-salicyloylamino-1,2,4-triazole and N,N,N'-trimethylethylenediamine; hindered amine compounds such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, condensates of 1,2,3,4-butanetetracarboxylic acid, 1,2,2,6,6-pentamethyl-4-piperidinol and β,β,β',β',-tetramethyl-3,9-[2,4,8,10-tetraoxaspiro(5,5)undecane]diethanol, and polycondensates of succinic acid dimethyl-1-(2-hydroxyethyl)-4-hydroxy-2,2,6,6,-tetramethylpiperidine; and polyamines such as 3,9-bis[2-(3,5-diamino-2,4,6-triazaphenyl)ethyl]-2,4,8,10-tetraoxaspiro[5.5]undecane, ethylenediamine-tetraacetic acid, alkali metal (Li, Na, K) salts of ethylenediamine-tetraacetic acid, N,N'-disalicylidene-ethylenediamine, N,N'-disalicylidene-1,2-propylenediamine, N,N''-disalicylidene-N'-methyl-dipropylenetriamine and 3-salicyloylamino-1,2,4-triazole. Among these, at least one of aromatic amine compounds, alkylamine compounds having not less than 4 carbon atoms, and amine compounds having a pyrimidine skeleton is preferably contained.

Specific examples of the alkali metal compounds include lithium compounds such as lithium isopropoxide, lithium chloride, lithium acetate, lithium lactate, lithium octoate, lithium stearate, lithium naphthenate, lithium t-butyl carbonate, lithium sulfate and lithium oxide; sodium compounds such as sodium isopropoxide, sodium chloride, sodium acetate, sodium lactate, sodium octoate, sodium stearate, sodium naphthenate, sodium t-butyl carbonate, sodium sulfate and sodium oxide; and potassium compounds such as potassium isopropoxide, potassium chloride, potassium acetate, potassium lactate, potassium octoate, potassium stearate, potassium naphthenate, potassium t-butyl carbonate, potassium sulfate and potassium oxide. In particular, least one of organic carboxylic acid alkali metal compounds having not less than 4 carbon atoms is preferably contained.

Examples of the alkaline earth metal compounds include magnesium compounds such as magnesium diisopropoxide, magnesium chloride, magnesium acetate, magnesium lactate, magnesium stearate, magnesium carbonate, magnesium sulfate and magnesium oxide; calcium compounds such as calcium diisopropoxide, calcium chloride, calcium acetate, calcium octoate, calcium naphthenate, calcium lactate, calcium stearate and calcium sulfate; barium compounds such as barium diisopropoxide, barium chloride, barium acetate, barium octoate, barium naphthenate, barium lactate, barium stearate and barium sulfate. In particular, at least one of organic carboxylic acid alkaline earth metal compounds having not less than 4 carbon atoms is preferably contained.

The amount of the amine compound(s), alkali metal(s) and/or alkaline earth metal(s) to be added is not restricted and, in view of achieving excellent hydrolysis resistance, the amount is preferably 0.001 to 2 parts by weight, more preferably 0.01 to 1 part by weight, still more preferably 0.05 to 0.5 part by weight, most preferably 0.08 to 0.3 part by weight with respect to 100 parts by weight of the poly(lactic acid) resin. In cases where an amine compound is used, the ratio of the molar amount of nitrogen atoms of the amine compound with respect to the molar amount of sulfur atoms of the sulfur-containing compound containing sulfur having an oxidation number of not less than +5 as a catalyst in the polymer after solid-phase polymerization is preferably 0.3 to 0.9, more preferably 0.4 to 0.8. The timing of addition of the amine compound(s), alkali metal(s) and/or alkaline earth metal(s) is not restricted, and may be either before the beginning or after the completion of either the melt polymerization step or the solid-phase polymerization step. To obtain a poly(lactic acid) resin having a high melting point and a high molecular weight, the compound(s) is/are preferably added at the stage of the melt polymerization step and, to achieve excellent productivity, the compound(s) is/are more preferably added immediately before completion of the above-described melt polymerization conditions 1 (140° C. to 160° C., 13.3 to 66.6 kPa) or at the beginning of the above-described melt polymerization conditions 2 (160° C. to 180° C., 1.3 to 6.5 kPa), still more preferably added both immediately before the completion of the melt polymerization conditions 1 and at the beginning of the melt polymerization conditions 2. Further, similarly, to achieve excellent productivity, the compound(s) is/are preferably added after addition of the sulfur-containing compound containing sulfur having an oxidation number of not less than +5 as a catalyst. In cases where the compound(s) is/are added at the beginning of the melt polymerization conditions 2, the catalyst for solid-phase polymerization is preferably added after the addition of the amine compound(s), alkali metal(s) and/or alkaline earth metal(s). In cases where the compound(s) is/are added at the stages of both the melt polymerization conditions 1 and the melt polymerization conditions 2, the compound(s) is/are preferably added in an amount of 0.001 to 1 part by weight at each stage and, in view of achieving excellent productivity, the compound(s) is/are more preferably added in an amount of 0.01 to 0.5 part by weight at each stage, still more preferably added in an amount of 0.01 to 0.1 part by weight at each stage with respect to 100 parts by weight of the poly(lactic acid) resin. To obtain a poly(lactic acid) resin having excellent hydrolysis resistance, the compound(s) may also be preferably added after completion of the solid-phase polymerization step. The method of addition of the amine compound(s), alkali metal(s) and/or alkaline earth metal(s) is not restricted, and examples of the method include a method wherein melt kneading is carried out at a temperature higher than the melting point of the poly(lactic acid) resin and a method wherein the compound(s) is/are dissolved in a solvent and the resulting solution is mixed, followed by removal of the solvent. For efficient production, the method wherein melt kneading is carried out at a temperature higher than the melting point of the poly(lactic acid) resin is preferred. The method of melt kneading may be either a batch method or continuous method, and examples of the apparatus which may be used include single screw extruders, twin screw extruders, multi-screw extruders, plastomill, kneaders and stirred tank reactors equipped with a pressure reducing device. For efficient uniform kneading, a single screw extruder or twin screw extruder is preferably used. The temperature at which the amine compound(s), alkali metal(s) and/or alkaline earth metal(s) is/are added is preferably a temperature of 180 to 250° C. and, to achieve excellent mechanical properties, a temperature of 190 to 230° C. is more preferred. The pressure at which the amine compound(s), alkali metal(s) and/or alkaline earth metal(s) is/are added may be any of a reduced pressure, normal pressure and increased pressure. To remove gas generated during melt kneading, the pressure is preferably a reduced pressure. In terms of the atmospheric conditions during the melt kneading, the melt kneading may be carried out either in the air or under an atmosphere of an inert gas such as nitrogen. To reduce in the amount of gas generated during the melt kneading, the melt kneading is preferably carried out under an atmosphere of an inert gas.

In cases where the mixing is carried out in a solvent, a solvent that dissolves the polymer and monomers is used. Examples of the solvent which may be used include chloroform, methylene chloride and acetonitrile. In cases where the solvent needs to be removed after the mixing, the method for removing the solvent is not restricted, and examples of the method which may be used include a method wherein the solvent is evaporated at room temperature and a method wherein the solvent is evaporated under reduced pressure at a temperature higher than the boiling point of the solvent.

The crystallized poly(lactic acid) prepolymer prepared has a weight average molecular weight of 5,000 to 25,000, and the weight average molecular weight is preferably 10,000 to 20,000. The enthalpy of fusion ΔHm is 50 to 65 J/g, more preferably 53 to 60.

The acid value A mol/ton of the crystallized prepolymer needs to satisfy (1) below, preferably satisfies (5) below, more preferably satisfies (6) below:

$$450/(Mw/10{,}000-0.14) < A < 950/(Mw/10{,}000-0.14) \quad (1)$$

(wherein Mw represents the weight average molecular weight of the crystallized prepolymer)

$$500/(Mw/10{,}000-0.14) < A < 900/(Mw/10{,}000-0.14) \quad (5)$$

$$550/(Mw/10{,}000-0.14) < A < 850/(Mw/10{,}000-0.14) \quad (6).$$

The lactide content L is preferably 0.1 to 3.0 wt %, more preferably 0.5 to 2.5 wt %.

When the crystallized prepolymer is poly-L-lactic acid or poly-D-lactic acid, in the case of poly-L-lactic acid, the D-lactic acid content d is preferably 0.2 to 2.0 mol %, more preferably 0.3 to 1.5 mol % and, in the case of poly-D-lactic acid, the L-lactic acid content l is preferably 0.2 to 2.0 mol %, more preferably 0.3 to 1.5 mol %.

The ratio of the weight average molecular weight with respect to the number average molecular weight is preferably 1.2 to 3 in view of the uniformity of the physical properties of the polymer, and the ratio is more preferably 1.4 to 2.5.

The weight average molecular weight and the number average molecular weight mean the values of weight average molecular weight and number average molecular weight in terms of a poly(methyl methacrylate) standard as measured by gel permeation chromatography (GPC) using hexafluoroisopropanol as a solvent; the enthalpy of fusion ΔHm means the enthalpy of the melting peak upon temperature increase as measured by differential scanning calorimetry (DSC); the acid value A means the amount of terminal carboxyl groups as measured by neutralization titration with an alkaline solution; the lactide content means the content in the prepolymer as measured by proton NMR; and the D-lactic acid content d and the L-lactic acid content l mean the contents in the total lactic acid component as measured by liquid chromatography.

To the poly(lactic acid) resin obtained by the production method, one or more of normal additives may be added as long as the product is not adversely affected. Examples of such additives include fillers (glass fibers, carbon fibers, metal fibers, natural fibers, organic fibers, glass flakes, glass beads, ceramic fibers, ceramic beads, asbestos, wollastonite, talc, clay, mica, sericite, zeolite, bentonite, montmorillonite, synthetic mica, dolomite, kaolinite, silicic acid fine powder, feldspar powder, potassium titanate, shirasu balloon, calcium carbonate, magnesium carbonate, barium sulfate, calcium oxide, aluminum oxide, titanium oxide, aluminum silicate, silicon oxide, plaster, novaculite, dawsonite, white clay and the like), ultraviolet absorbers (resorcinol, salicylate, benzotriazole, benzophenone and the like), lubricants, releasing agents (montanic acid and salts thereof, esters thereof and half esters thereof, stearyl alcohol, stearamide, polyethylene wax and the like), coloring agents including dyes (nigrosine and the like) and pigments (cadmium sulfide, phthalocyanine and the like), anti-coloring agents (phosphites, hypophosphites and the like), flame retardants (red phosphorus, phosphoric acid esters, brominated polystyrene, brominated polyphenylene ether, brominated polycarbonate, magnesium hydroxide, melamine, cyanuric acid and salts thereof, and the like), electrically conducting agents or coloring agents (carbon black and the like), tribological property improving agents (graphite, fluorine resins and the like), nuclear agents (inorganic nucleating agents including talc; organic amide compounds including ethylenebislauric acid amide, ethylenebis-12-dihydroxystearic acid amide and trimesic acid tricyclohexylamide; pigment nucleating agents including copper phthalocyanine and Pigment Yellow 110; organic carboxylic acid metal salts; phenylphosphonic acid zinc; and the like) and antistatic agents.

The poly(lactic acid) resin composition obtained by the method may additionally contain at least one of other thermoplastic resins (polyethylene, polypropylene, acrylic resins, polyamide, polyphenylene sulfide resins, polyether ether ketone resins, polyester, polysulfone, polyphenylene oxide, polyacetal, polyimide, polyetherimide and the like), thermosetting resins (phenol resins, melamine resins, polyester resins, silicone resins, epoxy resins and the like), soft thermoplastic resins (ethylene/glycidyl methacrylate copolymers, polyester elastomers, polyamide elastomers, ethylene/propylene terpolymers, ethylene/butene-1 copolymers and the like) and the like as long as the product is not adversely affected.

The poly(lactic acid) resin composition obtained by the method, even after being once heat-melted and solidified upon processing into a molded article or the like, has a high molecular weight, and is likely to form a poly(lactic acid) resin having high heat resistance as well as excellent thermal stability and hue.

EXAMPLES

Our resin, prepolymers and methods will now be described more specifically by way of Examples. The number of parts in Examples herein represents parts by weight.

The measurement methods and judgment methods used herein were as follows.

(1) Weight Average Molecular Weight

This is the value of weight average molecular weight in terms of a poly(methyl methacrylate) standard as measured by gel permeation chromatography (GPC) using hexafluoroisopropanol as a solvent.

(2) Acid Value

The polymer was dissolved in an o-cresol/chloroform-mixed solvent (volume ratio, 2:1), and the resulting solution was subjected to neutralization titration with a potassium hydroxide/ethanol solution at a known concentration to measure the acid value.

(3) Enthalpy of Fusion before Solid-Phase Polymerization

Under nitrogen atmosphere, the temperature was increased from 30° C. to 200° C. at a rate of 20° C./min. to measure the enthalpy of fusion by differential scanning calorimetry (DSC).

(4) Melting Point after Solid-Phase Polymerization

Under nitrogen atmosphere, the temperature was kept at 200° C. for 2 minutes and then decreased to 30° C. at a rate of 20° C./min., followed by increasing the temperature at a rate of 20° C./min. to 200° C. to measure the melting point by differential scanning calorimetry (DSC).

(5) Amount of D-Isomer

The polymer was hydrolyzed with a sodium hydroxide solution and neutralized with hydrochloric acid. The amount of the D-isomer was then measured with a liquid chromatography to which an optical resolution column was attached.

(6) Lactide Content

The polymer was dissolved in deuterated chloroform and subjected to measurement by proton NMR. The lactide content was calculated based on the ratio between the areas of the peaks derived from lactide and the polymer.

(7) Hue

The hue was evaluated according to the following standards based on visual observation:

5: Colorless;
4: Intermediate between 3 and 5;
3: Colored in pale yellow;
2: Intermediate between 1 and 3;
1: Colored in yellow.

Example 1

In a reaction vessel equipped with an agitator and a reflux condenser, 100 parts by weight of 90 wt % aqueous L-lactic acid (amount of the D-isomer, 0.4%; manufactured by Wako Pure Chemical Industries, Ltd.) solution was placed and, as catalysts, tin(II) acetate (manufactured by Kanto Chemical Co., Inc.) was added at 120 ppm in terms of tin atoms with respect to L-lactic acid (excluding water contained together in the material) and methanesulfonic acid (manufactured by Wako Pure Chemical Industries, Ltd.) was added at 1,100 ppm in terms of sulfur atoms with respect to L-lactic acid (excluding water contained together in the material). The temperature was adjusted to 155° C. and the pressure was gradually decreased to 700 Pa. The reaction was allowed to proceed for 3.5 hours while water was removed, and the polymerization reaction was then carried out at a temperature of 175° C. at a pressure of 400 Pa for 7 hours, to obtain a prepolymer having a weight average molecular weight of 14,700. The obtained prepolymer was dropped onto a belt under nitrogen atmosphere without allowing contact with the ambient air, and cooled, to obtain a pellet in the shape of a ball having a diameter of 3 mm. Immediately thereafter, the pellet was treated under nitrogen atmosphere at 80° C. for 1 hour, at 100° C. for 1 hour and then at 120° C. for 1 hour, to allow crystallization. The crystallized prepolymer had an acid value of 452 mol/ton and an enthalpy of fusion of 55.3 J/g. Immediately thereafter, at a pressure of 50 Pa, the temperature was continuously increased from 140° C. to 160° C. for 20 hours (temperature increasing rate, 1° C. per hour), and solid-phase polymerization was then carried out at 160° C. for 20 hours. In 100 parts by weight of the obtained poly(lactic acid) resin, 0.2 part by weight of stearyl acid phosphate was mixed, and the resulting mixture was subjected to melt kneading using a biaxial extruder at 190° C. Properties of the obtained poly (lactic acid) resin were as shown in Table 1.

Examples 2 to 15, Comparative Examples 1 to 8

The operation was carried out in the same manner as in Example 1 except that the conditions for melt polymerization, conditions for crystallization of the prepolymer and conditions for solid-phase polymerization were as shown in Tables 1 and 2. The results are shown in Tables 1 and 2. It should be noted that, in Example 9, the length of time of temperature increase in the solid-phase polymerization was increased to 25 hours. In Comparative Examples 2 to 8, the production of the pellet was carried out in the air.

TABLE 1

|  |  | Example 1 | Example 2 | Example 3 | Example 4 | Example 5 | Example 6 | Example 7 | Example 8 |
|---|---|---|---|---|---|---|---|---|---|
| Melt polymerization conditon | Final temperature [° C.] | 170 | 170 | 170 | 170 | 170 | 170 | 170 | 170 |
|  | Final pressure [kPa] | 1.32 | 1.32 | 1.32 | 1.32 | 1.32 | 1.32 | 1.32 | 1.32 |
|  | Retention time of final temperature & pressure [hr] | 6 | 6 | 6 | 3 | 3 | 3 | 9 | 9 |
| Crystallization condition | Heat treatment step 1 | 80° C. × 1 hr in Nitrogen gas | 80° C. × 1 hr in air | 80° C. × 1 hr in air | 80° C. × 1 hr in Nitrogen gas | 80° C. × 1 hr in air | 80° C. × 1 hr in Nitrogen gas | 80° C. × 1 hr in Nitrogen gas | 80° C. × 1 hr in air |
|  | Heat treatment step 2 | 100° C. × 1 hr in Nitrogen gas | 100° C. × 1 hr in Nitrogen gas | 100° C. × 1 hr in air | 100° C. × 1 hr in Nitrogen gas | 100° C. × 1 hr in Nitrogen gas | 100° C. × 1 hr in air | 100° C. × 1 hr in Nitrogen gas | 100° C. × 1 hr in Nitrogen gas |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | Heat treatment step 3 | 120° C. × 1 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas |
| Crystallized prepolymer properties (before solid-phase polymerization) | Weight average molecular weight Mw | 14,077 | 14,600 | 14,100 | 10,800 | 10,500 | 10,100 | 19,700 | 19,300 |
|  | 450/ (Mw/10,000-0.14) | 338 | 341 | 354 | 479 | 495 | 517 | 246 | 251 |
|  | 950/ (Mw/10,000-0.14) | 714 | 720 | 748 | 1,011 | 1,044 | 1,092 | 519 | 531 |
|  | Acid value A [mol/ton] | 457 | 595 | 710 | 655 | 823 | 1,050 | 301 | 378 |
|  | Enthalpy of fusion ΔHm [J/g] | 55.3 | 54.6 | 53.4 | 53.8 | 52.5 | 54.5 | 56.6 | 56.2 |
|  | Lactide content L [wt %] | 1.59 | 1.54 | 1.45 | 1.55 | 1.54 | 1.45 | 1.62 | 1.42 |
|  | D-lactic acid content d [mol %] | 1.0 | 1.0 | 1.0 | 0.9 | 0.9 | 0.9 | 1.1 | 1.1 |
| Solid-phase polymerization conditon | Temperature increasing rate [° C./hr] | 1.0 | 1.0 | 1.0 | 1.0 | 1.0 | 1.0 | 1.0 | 1.0 |
|  | Final temperature [° C.] | 160 | 160 | 160 | 160 | 160 | 160 | 160 | 160 |
| Polymer properties | Weight average molecular weight | 231,000 | 184,000 | 155,000 | 223,000 | 184,000 | 149,000 | 212,000 | 165,000 |
|  | Melting point [° C.] | 169 | 169 | 168 | 169 | 169 | 167 | 168 | 168 |
|  | Amount of D-isomer (%) | 0.8 | 0.9 | 0.9 | 0.7 | 0.7 | 0.7 | 0.9 | 0.9 |
|  | Hue | 5 | 5 | 5 | 5 | 5 | 5 | 4 | 4 |

TABLE 2

|  |  | Example 9 | Example 10 | Example 11 | Example 12 | Example 13 | Example 14 | Example 15 |
|---|---|---|---|---|---|---|---|---|
| Melt polymerization conditon | Final temperature [° C.] | 170 | 170 | 170 | 170 | 180 | 160 | 170 |
|  | Final pressure [kPa] | 1.32 | 1.32 | 2.64 | 0.66 | 1.32 | 1.32 | 1.32 |
|  | Retention time of final temperature & pressure [hr] | 6 | 6 | 6 | 6 | 6 | 6 | 6 |
| Crystallization condition | Heat treatment step 1 | 80° C. × 1 hr in air | 80° C. × 1 hr in Nitrogen gas | 80° C. × 1 hr in Nitrogen gas | 80° C. × 1 hr in Nitrogen gas | 80° C. × 1 hr in Nitrogen gas | 80° C. × 1 hr in Nitrogen gas | 80° C. × 1 hr in Nitrogen gas |
|  | Heat treatment step 2 | 100° C. × 1 hr in air | 100° C. × 1 hr in Nitrogen gas | 100° C. × 1 hr in Nitrogen gas | 100° C. × 1 hr in Nitrogen gas | 100° C. × 1 hr in Nitrogen gas | 100° C. × 1 hr in Nitrogen gas | 100° C. × 1 hr in Nitrogen gas |
|  | Heat treatment step 3 | 120° C. × 1 hr in Nitrogen gas | 120° C. × 2 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas | 120° C. × 1 hr in Nitrogen gas |
| Crystallized prepolymer properties (before solid-phase polymerization) | Weight average molecular weight Mw | 19,000 | 14,500 | 13,300 | 15,600 | 24,000 | 8,400 | 14,700 |
|  | 450/ (Mw/10,000-0.14) | 256 | 344 | 378 | 317 | 199 | 643 | 338 |
|  | 950/ (Mw/10,000-0.14) | 540 | 725 | 798 | 669 | 420 | 1,357 | 714 |
|  | Acid value A [mol/ton] | 510 | 426 | 491 | 393 | 239 | 1,257 | 452 |
|  | Enthalpy of fusion ΔHm [J/g] | 56.5 | 56.9 | 52.7 | 57.9 | 59.1 | 51.1 | 55.3 |
|  | Lactide content L [wt %] | 1.45 | 1.56 | 2.60 | 0.50 | 1.61 | 1.53 | 1.59 |
|  | D-lactic acid content d [mol %] | 1.1 | 1.0 | 0.9 | 0.9 | 1.8 | 0.5 | 1.0 |
| Solid-phase polymerization conditon | Temperature increasing rate [° C./hr] | 1.0 | 1.0 | 1.0 | 1.0 | 1.0 | 1.0 | 1.0 |
|  | Final temperature [° C.] | 160 | 160 | 160 | 160 | 160 | 160 | 165 |
| Polymer properties | Weight average molecular weight | 141,000 | 191,000 | 182,000 | 192,000 | 174,000 | 182,000 | 242,000 |
|  | Melting point [° C.] | 166 | 167 | 167 | 167 | 166 | 167 | 169 |
|  | Amount of D-isomer (%) | 0.9 | 0.8 | 0.7 | 0.7 | 1.6 | 0.3 | 0.7 |
|  | Hue | 4 | 5 | 5 | 5 | 4 | 5 | 4 |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Melt polymerization conditon | Final temperature [° C.] | 160 | 160 | 180 | 180 | 170 | 170 | 175 | 175 |
|  | Final pressure [kPa] | 1.32 | 1.32 | 0.5 | 0.5 | 1.32 | 1.32 | 1.32 | 1.32 |
|  | Retention time of final temperature & pressure [hr] | 10 | 6 | 6 | 6 | 6 | 9 | 9 | 9 |
| Crystallization condition | Heat treatment step 1 | 80° C. × 1 hr in Nitrogen gas | 50° C. × 1 hr in water | 120° C. × 2 hr in air | 70° C. × 1 hr in air | 120° C. × 2 hr in air | 120° C. × 1.5 hr in air | 120° C. × 1 hr in air | 50° C. × 1 hr in anhydrous acetone |
|  | Heat treatment step 2 | absence | 60° C. × 1 hr in Nitrogen gas | absence | 100° C. × 1 hr in air | absence | absence | absence | 100° C. × 2 hr in vacuum |
|  | Heat treatment step 3 | absence | 120° C. × 10 hr in Nitrogen gas | absence | absence | absence | absence | absence | absence |
| Crystallized prepolymer properties (before solid-phase polymerization) | Weight average molecular weight Mw | 10,000 | 8,200 | 35,000 | 35,000 | 14,100 | 19,000 | 24,500 | 24,800 |
|  | 450/(Mw/10,000−0.14) | 523 | 662 | 134 | 134 | 354 | 256 | 195 | 192 |
|  | 950/(Mw/10,000−0.14) | 1,105 | 1,397 | 283 | 283 | 748 | 540 | 411 | 406 |
|  | Acid value A [mol/ton] | 405 | 1,551 | 417 | 329 | 934 | 675 | 455 | 185 |
|  | Enthalpy of fusion ΔHm [J/g] | 42.1 | 50.5 | 59.7 | 58.1 | 52.1 | 52.0 | 49.8 | 57.4 |
|  | Lactide content L [wt %] | 3.62 | 0.05 | 1.39 | 1.47 | 1.36 | 1.36 | 1.25 | 0.05 |
|  | D-lactic acid content d [mol %] | 1.1 | 1.1 | 2.3 | 2.5 | 1.0 | 1.1 | 1.6 | 1.6 |
| Solid-phase polymerization conditon | Temperature increasing rate [° C./hr] | 1.0 | 1.0 | 1.0 | 1.0 | 1.0 | 1.0 | 1.0 | 1.0 |
|  | Final temperature [° C.] | 160 | 160 | 160 | 160 | 160 | 160 | 160 | 160 |
| Polymer properties | Weight average molecular weight | 83,000 | 81,000 | 53,000 | 44,000 | 71,000 | 68,000 | 89,000 | 115,000 |
|  | Melting point [° C.] | 158 | 158 | 155 | 155 | 157 | 157 | 162 | 166 |
|  | Amount of D-isomer (%) | 0.9 | 1.0 | 1.7 | 1.8 | 0.8 | 0.9 | 1.5 | 1.4 |
|  | Hue | 4 | 5 | 4 | 4 | 5 | 5 | 4 | 4 |

INDUSTRIAL APPLICABILITY

The poly(lactic acid) resin composition obtained by our method can be widely used as a molded article. Examples of the molded article include films, sheets, fibers/cloths, non-woven fabrics, injection-molded articles, extrusion-molded articles, vacuum/pressure-molded articles, blow-molded articles and complexes with other materials. These molded articles are useful for agricultural materials, garden materials, fishery materials, civil engineering and construction materials, stationery, medical supplies, automobile parts, electrical/electronic components and other uses.

The invention claimed is:

1. A method of producing a poly(lactic acid) resin comprising:
    carrying out direct polycondensation using lactic acid as a main raw material with a tin organic carboxylate and methanesulfonic acid to prepare a crystallized prepolymer having a weight average molecular weight of 5,000 to 25,000, an enthalpy of fusion ΔHm of 50 to 65 J/g and an acid value A mol/ton satisfying (1):

450/(Mw/10,000−0.14)<A<950/(Mw/10,000−0.14)   (1)

wherein Mw represents weight average molecular weight of said crystallized prepolymer and said crystallized prepolymer is a pellet having a maximum diameter of about 1.5 to 6 mm; and
    subjecting said crystallized prepolymer to solid-phase polymerization.

2. The method according to claim 1, wherein lactide content L of said crystallized prepolymer is 0.1 to 3.0 wt %.

3. The method according to claim 1, wherein said crystallized prepolymer is poly-L-lactic acid or poly-D-lactic acid, and, in the poly-L-lactic acid, D-lactic acid content d is 0.2 to 2.0 mol %, and in the poly-D-lactic acid, L-lactic acid content l is 0.2 to 2.0 mol %.

4. The method according to claim 1, wherein enthalpy of fusion ΔHm of said crystallized prepolymer is not less than 53 J/g.

5. The method according to claim 1, wherein acid value A mol/ton of said crystallized prepolymer satisfies (2):

550/(Mw/10,000−0.14)<A<850/(Mw/10,000−0.14)   (2).

6. The method according to claim 1, wherein a temperature increasing rate in said solid-phase polymerization is not more than 10° C. per hour.

7. The method according to claim 1, wherein final temperature in said solid-phase polymerization is 155 to 165° C.

8. A crystallized poly(lactic acid) prepolymer pellet containing a tin organic carboxylate and methanesulfonic acid having a maximum diameter of about 1.5 to 6 mm, a weight average molecular weight of 5,000 to 25,000, an enthalpy of fusion ΔHm of 50 to 65 J/g and an acid value A mol/ton satisfying (1):

450/(Mw/10,000−0.14)<A<950/(Mw/10,000−0.14)   (1)

(wherein Mw represents weight average molecular weight of said crystallized prepolymer).

9. The crystallized poly(lactic acid) prepolymer pellet according to claim 8, wherein said crystallized poly(lactic acid) prepolymer is prepared by carrying out direct polycondensation using lactic acid as a main raw material to obtain a prepolymer, and crystallizing said prepolymer.

10. The method according to claim 2, wherein said crystallized prepolymer is poly-L-lactic acid or poly-D-lactic acid, and, in the poly-L-lactic acid, D-lactic acid content d is 0.2 to 2.0 mol %, and in the poly-D-lactic acid, L-lactic acid content 1 is 0.2 to 2.0 mol %.

11. The method according to claim 1, wherein enthalpy of fusion ΔHm of said crystallized prepolymer is not less than 53 µg.

12. The method according to claim 3, wherein enthalpy of fusion ΔHm of said crystallized prepolymer is not less than 53 J/g.

13. The method according to claim 2, wherein acid value A mol/ton of said crystallized prepolymer satisfies the (2) below:

$$550/(Mw/10,000-0.14) < A < 850/(Mw/10,000-0.14) \quad (2).$$

14. The method according to claim 3, wherein acid value A mol/ton of said crystallized prepolymer satisfies the (2) below:

$$550/(Mw/10,000-0.14) < A < 850/(Mw/10,000-0.14) \quad (2).$$

* * * * *